United States Patent [19]
Zhou et al.

[11] Patent Number: 5,812,546
[45] Date of Patent: Sep. 22, 1998

[54] DEMODULATOR FOR CDMA SPREAD SPECTRUM COMMUNICATION USING MULTIPLE PN CODES

[75] Inventors: Changming Zhou; Guoliang Shou; Xuping Zhou; Makoto Yamamoto; Kenzo Urabe; Sunao Takatori, all of Tokyo, Japan

[73] Assignees: Yozan, Inc.; Kokusai Electric Co., Ltd., both of Tokyo, Japan

[21] Appl. No.: 802,635

[22] Filed: Feb. 19, 1997

[30] Foreign Application Priority Data

Feb. 19, 1996 [JP] Japan .................................. 8-055480

[51] Int. Cl.[6] .................................................. H04J 13/04
[52] U.S. Cl. ...................... 370/342; 370/203; 370/479; 375/200; 375/205; 375/206; 375/207; 329/308; 364/724.11
[58] Field of Search ..................................... 375/200, 206, 375/207, 208, 210, 343; 370/206, 335, 342; 327/91, 93, 95, 96; 364/724.11; 329/308

[56] References Cited

U.S. PATENT DOCUMENTS

| 5,031,191 | 7/1991 | Hiramatsu et al. | 375/200 |
| 5,555,286 | 9/1996 | Fattouche et al. | 375/206 |
| 5,668,806 | 9/1997 | Arai et al. | 370/342 |

OTHER PUBLICATIONS

Andrew J. Viterbi, "CDMA Principles of Spread Spectrum Commmunication", Copyright 1995.

Jinkang Zhu, Shigenobu Sasaki and Gen Marubayashi, "Proposal of Parallel Combinatory Spread Spectrum Communication System", The Institute of Electronics, Information and Communication Engineers, B–II vol. J74–B–II No. 5, May 1991, pp. 207–214.

"Synchronization method using quadrature modulation and demodulation for parallel combinatory SS communications", The Institute of Electronics, Information and Communication Engineers.

"An Experimental ISM band SS Wireless LAN System Using Parallel Combinatory Spread Spectrum Communication System", The Institute of Electronics, Information and Communication Engineers, Report of IEICE, SST93–93 (1994–03).

*Primary Examiner*—Benedict V. Safourek
*Assistant Examiner*—Kenneth Vanderpuye
*Attorney, Agent, or Firm*—Cushman Darby & Cushman IP Group of Pillsbury Madison & Sutro LLP

[57] ABSTRACT

The demodulator has a plurality of matched filters in parallel. Each matched filter has a different binary PN code, a plurality of sample holders, a plurality of multipliers, an adder, and a controller. The sample holders has a common input, a switch, a first capacitor, a first inverse amplifier with an output and an input connected to the common input through the switch and the capacitor, and a first feedback capacitor for feeding the output of the first inverse amplifier back to the input. Each multiplier has a first and second sub-multiplexers, one of sub-multiplexer selecting corresponding sample holder output and another sub-multiplexer selecting a reference voltage.

18 Claims, 9 Drawing Sheets

DEMODULATOR FOR CDMA SPREAD SPECTRUM COMMUNICATION USING MULTIPLE PN CODES

BACKGROUND OF INVENTION

1. Field of Invention

The present invention relates to a demodulator and a demodulating method for a base and mobile stations which communicate each other by high-speed CDMA spectrum spreading communication method using a plurality of PN codes. This invention also relates to a multi-user demodulator and a demodulating method for a base station which communicates by DS-CDMA (Direct Sequence-Code Division Multiple Access) spectrum spreading communication method.

2. Related Art

To achieve higher communication speed, M-array method, parallel method, and parallel combination method have been proposed for the spectrum spreading communication. (See SHUKON, Yasusi, et al. Electronic Information Communication Society Papers, B-II, Vol. J74-B-II, No. 5, pp.207–214, May 1991.) With the M-array method, transmitting bit pattern is associated with one PN code within a plurality of PN codes previously prepared. In the parallel method, transmitting data is divided into parallel, spread by a plurality of PN codes previously prepared, and transmitted in parallel. In the parallel combination method, a plurality of PN codes are previously prepared, and a combination of the PN codes is associated with the corresponding transmitting signal.

Also in DS-CDMA spectrum spreading communication, a base station receiver must receive signals from a plurality of users, separates and extracts each user signal considering the interference among signals, and despreads the extracted signal. Each user signal is spread using different PN codes.

In such high-speed spread spectrum communications or multi-user spread spectrum communication, a receiver must be in capable of receiving a plurality of PN codes, and the demodulator within the receiver needs multiple matched filters, which determine identity of two signals. Each signal is multiplied by multipliers with a different PN code. Accordingly, if multiple matched filters are made by conventional digital circuits, the entire circuit becomes large in size, with a large power consumption. Despreading circuit using SAW elements is also known. However, it is difficult for a single SAW element to realize the entire circuit. Moreover, the S/N ratio of SAW element is low.

Therefore it is the object of the present invention to overcome the above issues, and to provide a demodulator and a CDMA communication station having the demodulator applicable to high-speed CDMA spectrum spreading communication. It is also an object of the present invention to provide a multi-user demodulator and a CDMA communication station having the demodulator suitable for the multi-user DS-CDMA spread spectrum communication.

SUMMARY OF INVENTION

The demodulator comprises a plurality of matched filters in parallel. Each matched filter has a different binary PN code, a plurality of sample holders, a plurality of multipliers, an adder, and a controller. The sample holders has a common input, a switch, a first capacitor, a first inverse amplifier with an output and an input connected to the common input through the switch and the capacitor, and a first feedback capacitor for feeding the output of the first inverse amplifier back to the input thereof. Each multiplier has a first and second sub-multiplexers, one of sub-multiplexer selecting corresponding sample holder output and another sub-multiplexer selecting a reference voltage.

The adder has a plurality of second capacitors, a second inverse amplifier with an output and an input connected to the first sub-multiplexers through the second capacitors, a second feedback capacitor for feeding the output of the second inverse amplifier back to the input thereof, a plurality of third capacitors, a third inverse amplifier having an output, and an input connected to the second sub-multiplexers and second inverse amplifier through the third capacitors, and a third feedback capacitor for feeding the output of the third inverse amplifier back to the input thereof.

The controller closes one switch of the sample holders while opening the other switches, and switches over the first and second sub-multiplexers with a predetermined combination in response to the PN code of the multiplexer. Each of the first, second and third inverse amplifiers has odd number of MOS inverters. Each of the sample holders is used for the plurality of matched filters in common.

The received signal is held by the analog sample holders SH21 to SH2n and supplied to the multipliers for the PN codes multiplication. Many multiplications and integration can be done by a small circuit with less power. Even with multiple matched filters, the circuit scale and power consumption are minimized, and a practical demodulator can be achieved.

PREFERRED EMBODIMENT

1. FIRST EMBODIMENT

Figure 1:
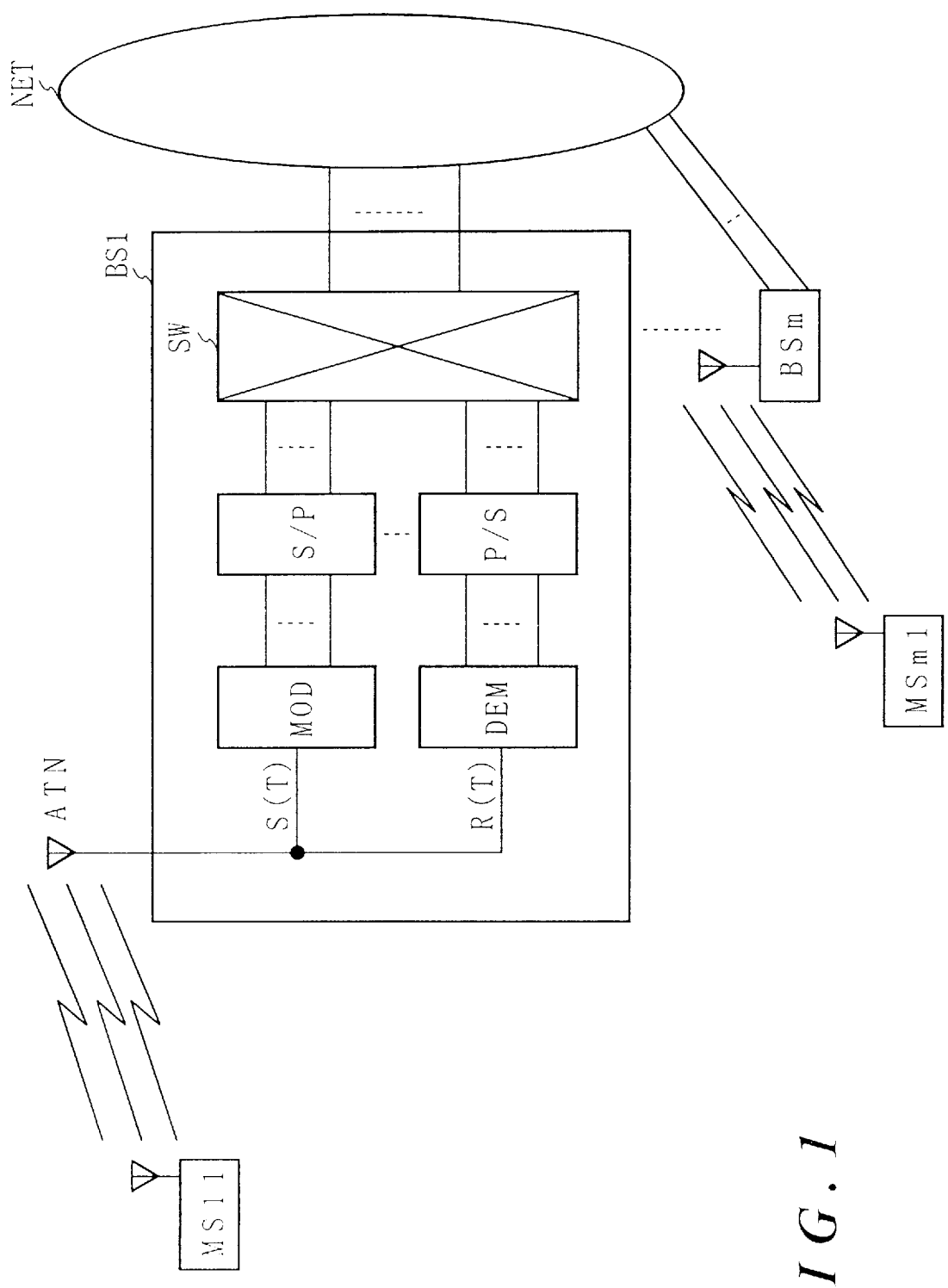
FIG. 1 is a block diagram of the communication system according to the present invention.

FIG. 1 is a block diagram of the communication system according to the first embodiment of the present invention. The base station BS1 sends and receives a signal to and from a user station MS11 using one or more PN codes through an antenna ATN. The transmitted data is converted from serial to parallel at a serial to parallel converter S/P and the parallel data is fed to modulator MOD and modulated. The modulated signal is fed to an antenna ATN. The received signal is fed to a demodulator DEM and demodulated to a parallel data. A parallel to serial converter P/S converts the parallel data to a serial binary signal. A switch SW switches the user data to and from the network NET.

The user station also has an antenna, a modulator, a demodulator, serial to parallel converter and a parallel to serial converter. These are the same as antenna ATN, demodulator DEM and parallel to serial converter P/S, and their explanations are omitted. Within the specification and claim, the base station and user station are comprehensively called as communication station.

Figure 2:
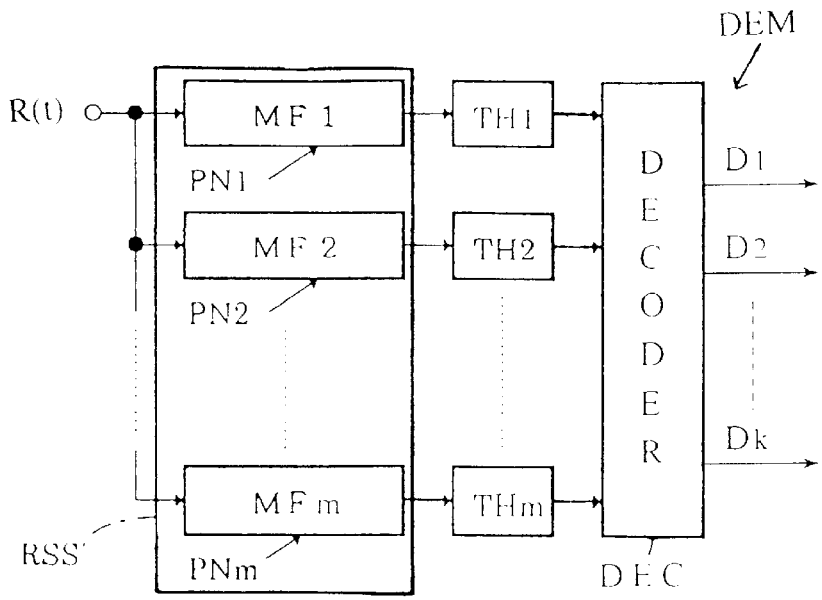
FIG. 2 is a block diagram of the M-array type demodulator according to the first embodiment of the present invention.

FIG. 2 illustrates an M-array type demodulator DEM of FIG. 1, having a despreading circuit RSS. The despreading circuit RSS has m matched filters MF1 to MFm connected to the input signal R(t) in parallel. Different PN codes PN1 to PNm are assigned to matched filters MF1 to MFm, respectively. Outputs of the matched filters MF1 to MFm are fed to peak detectors TH1 to THm, respectively, whose outputs are given to a decoder DEC. In the M-array method, transmitted signal corresponds to one PN code. Accordingly, when the demodulator receives a signal for its station, one of matched filters MF1 to MFm generates a peak.

The decoder DEC has m bit inputs for the m matched filters and k ($k=\log_2 m$) bit outputs, D1 to Dk. The decoder DEC decodes the input port number of the peak detecting matched filter and outputs the decoded data, which corresponds to the kind of the PN code. For example, when m=8 (k=3), the decoder DEC outputs as follows.

| Peak Detected Matched Filters | Decoder DEC Outputs (D3, D2, D1) |
|---|---|
| MF1 | (0, 0, 0) |
| MF2 | (0, 0, 1) |
| MF3 | (0, 1, 0) |
| MF4 | (0, 1, 1) |
| MF5 | (1, 0, 0) |
| MF6 | (1, 0, 1) |
| MF7 | (1, 1, 0) |
| MF8 | (1, 1, 1) |

Figure 3:
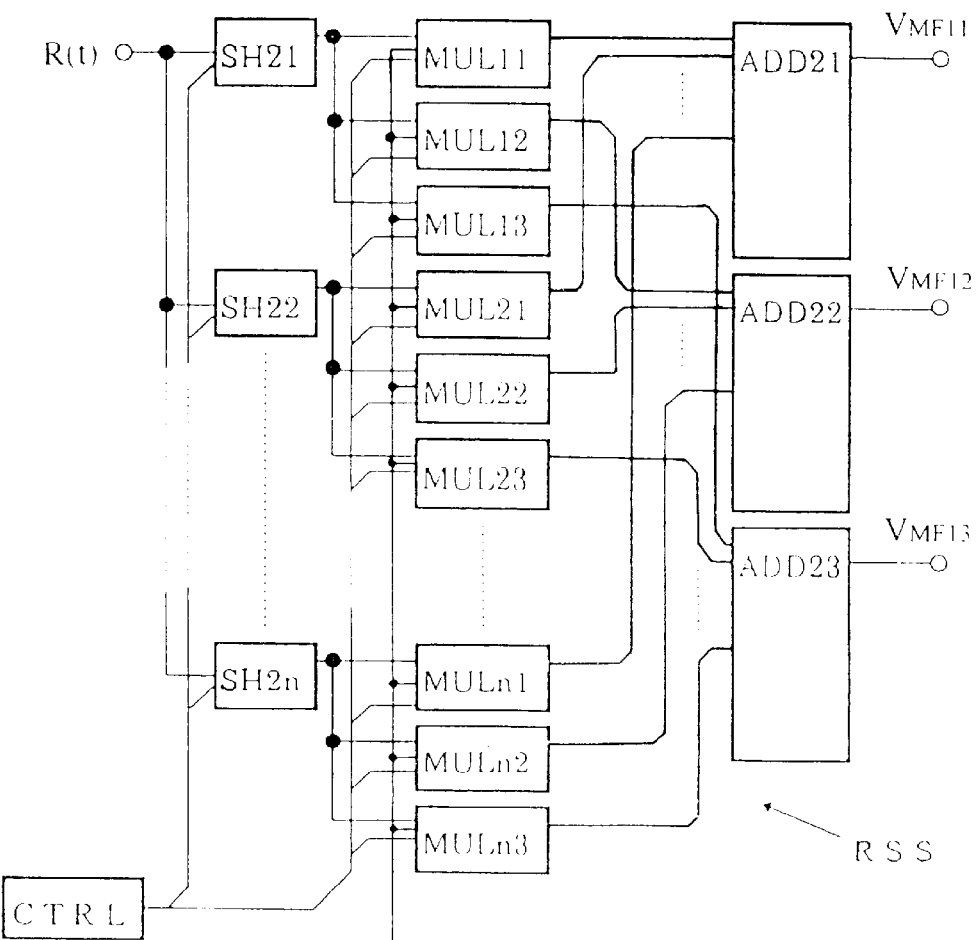
FIG. 3 is a block diagram of the despreading circuit RSS

FIG. 3 illustrates the detail of the despreading circuit RSS of FIG. 2. Within m matched filters of FIG. 2, only three matched filters are illustrated in FIG. 3 for simplifying the explanation. The despreading circuit RSS has sample holders SH21 to SH2n (n is the number of taps of the matched filter). The input signal R(t) is inputted to the sample holders SH21 to SH2n in parallel. Each sample holder holds a signal and outputs the signal to a plurality of destinations (three in the figure).

For example, sample holder SH21 outputs its signal to MUL11, MUL12 and MUL13. Similarly, sample holder SH22 outputs its signal to multipliers MUL21, MUL22 and MUL23, and sample holder SH2n outputs its signal to multipliers MULn1, MULn2 and MULn3. Each of the multipliers MUL11 to MULn3 is connected to a reference circuit REF which outputs reference voltage and to a controller CTRL that controls the multipliers MUL11 to MULn3 according to the PN codes.

Each of multiplier groups, MULi1 to MULn3 (i=1 to n) corresponds to each matched filter MF1 to MFm. Outputs of the multiplier groups MULi1 to MULim (i=1 to n) are given to the common adders ADD21 to ADD2m, respectively, each of which sums up each group of input signals and outputs the results as $V_{MF1}$ to $V_{MFm}$. The despreading circuit RSS has only a single group of sample holders SH21 to SH2n to hold the received signal, for a plurality of correlative operations. This reduces the entire circuit size and reduces power consumption, compared with providing a group of sample holders for each correlative operation.

Figure 4:
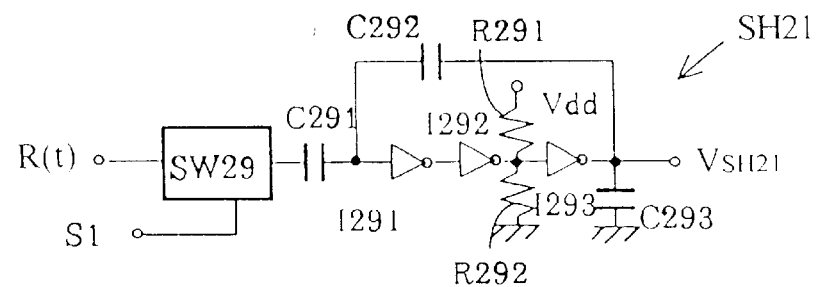
FIG. 4 is a circuit of the sample holder of FIG. 3.

FIG. 4 shows the structure of sample holder SH21 of FIG. 3. Input R(t) is supplied to capacitor C291 through a switch SW29. Output of the capacitor C291 is supplied to three-stage MOS inverters I291, I292 and I293 connected in series. Output of the last MOS inverter I293 is fed back through feedback capacitor C292 to the input of the first inverter I291. The feedback capacitor C292 gives the input voltage R(t) good linearity at the output of the last inverter I293.

When the switch SW29 is closed, capacitor C291 is charged to the input level R(t), and the output linearity is ensured by the feedback at the three stage MOS inverters I291 to I293. When the switch SW29 opens, sample holder SH21 holds the voltage of input R(t). Output of the last inverter I293 is grounded through the capacitor C293, while output of the second inverter I292 is connected to the power source Vdd and the ground through a pair of equivalent resistors R291 and R292, respectively. This structure prevents an oscillation of the inverse amplifier having the feedback system. Sample holders SH282 to SH28n have the same structure as SH21, and their explanations will be omitted.

Figure 5:
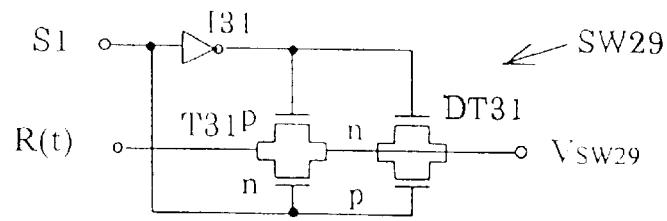
FIG. 5 is a circuit of the switch shown in FIG. 4.

FIG. 5 shows the switch SW29 of FIG. 4. The switch comprises an n-MOS transistor T31 whose source and drain are connected to drain and source of p-MOS dummy transistor DT31, respectively. Input R(t) is applied to the drain of the n-MOS transistor T31 whose source is outputted as VSH29 through the dummy transistor DT31. Control signal S1 is inputted to the gate of the n-MOS transistor T31. The control signal is also inverted by an inverter I131 and then inputted to the gate of the p-MOS dummy transistor DT31. When the signal S1 is high, transistors T31 and DT31 are conductive. When the signal S1 is low, transistors T31 and DT31 are not conductive.

Figure 6:
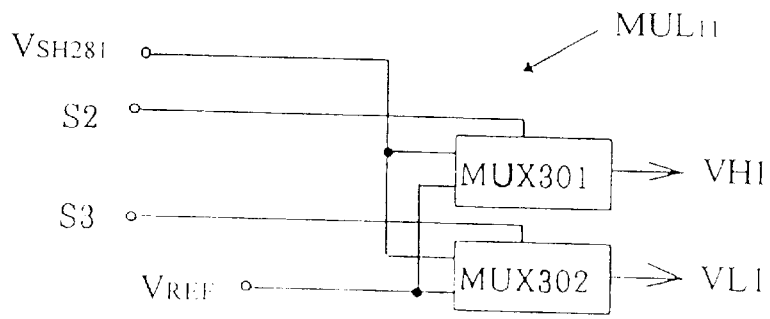
FIG. 6 is a circuit of the multiplier shown in FIG. 3.

FIG. 6 shows multiplier MUL11 including two multiplexers MUX301 and MUX 302, to which output VSH21 of the sample holder SH21 and a reference $V_{REF}$ from the reference generator REF are connected. Multiplexers MUX301, MUX302 are controlled by control signals S2 and S3, respectively. The control signals S2 and S3 are inverse of each other, so that, when one multiplexer outputs $V_{SH21}$, another multiplexer outputs $V_{REF}$. When multiplying the input $V_{SH21}$ by the spreading code element "1", multiplexer MUX301 outputs $V_{SH21}$. When multiplying the input voltage by the spreading code element "−1," multiplexer MUX302 outputs $V_{SH21}$. Outputs of multiplexers MUX301 and MUX302 are shown as VH1 and VL1 to represent high and low level responses, respectively.

Figure 7:
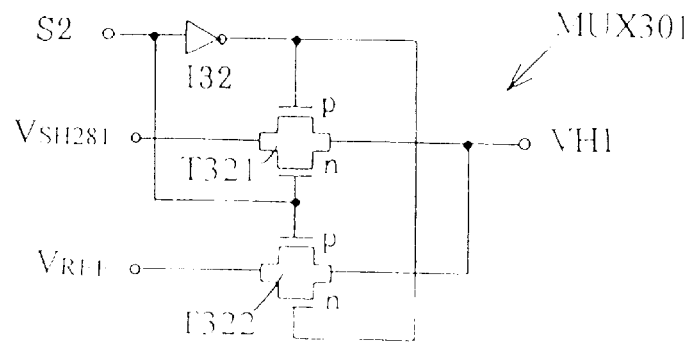
FIG. 7 is a circuit of the multiplexer shown in FIG. 6.

FIG. 7 shows the multiplexer MUX 301 having a pair of n-type and p-type MOS transistors T321 and T322. The sources of the transistors T321 and T322 are connected to a common output VH1. The drain of n-MOS transistor T321 inputs a signal $V_{SH21}$ from the sample holder SH21, while the drain of n-MOS transistor T322 inputs a reference voltage $V_{REF}$. Control signal S2 is fed to the gates of the n-MOS transistor T321 and p-MOS transistor T322. An inverter I32 inverts the control signal S2 and feeds it to the gates of p-MOS transistor T321 and n-MOS transistor T322. When the control signal S2 is high, the transistor T321 is conductive while the transistor T322 is not. When the control signal S2 is low, transistor T322 is conductive while transistor T321 is not. Thus, multiplexer MUX301 can selectively output either $V_{SH21}$ or $V_{REF}$ by the control signal S2.

Multiplexer MUX302 has the same structure as MUX301, but the connection of VSH21 and VREF are reversed. That is, VREF is connected to the n-MOS transistor T321, and VSH21 is connected to the P-MOS transistor T322. Accordingly, multiplexer MUX302 Outputs a signal opposite to the multiplexer MUX301 output. Multiplexer MUX302 outputs VREF when multiplexer MUX301 outputs VSH21. Multiplexer MUX302 outputs VSH21 when MUX301 outputs VREF. Control signal S2 corresponds to the spreading code. When control signal S2 is "1," the multiplier MUL11 outputs VSH21 from the multiplexer MUX301 and VREF from the multiplexer MUX302. When S2 is "0" (low) the multiplier MUL11 output VREF from the multiplexer MUX301 and VSH21 from the multiplexer MUX302. The multiplexers MUX301 and MUX302 supply their outputs to adder ADD21.

Figure 8:
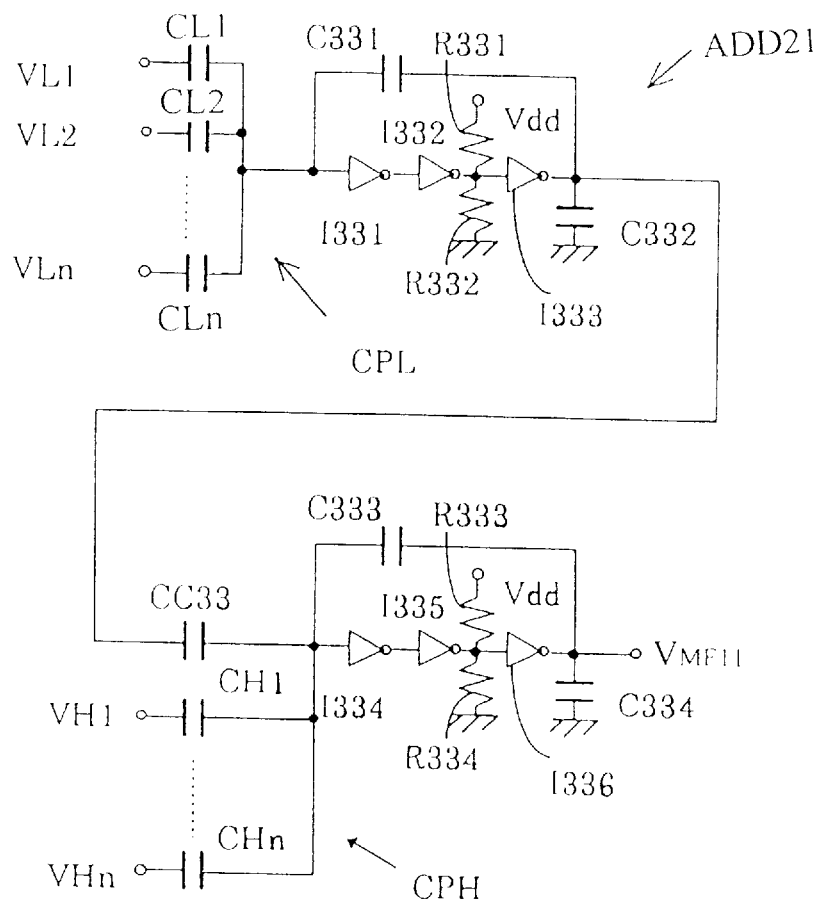
FIG. 8 is a circuit of the adder shown in FIG. 3.

FIG. 8 shows adder ADD21, having a capacitance coupling circuit CPH which receives high level signals VH1 to VHn from multipliers MUL11 to MUL28n, and a capacitance coupling circuit CPL which receives low level signals VL1 to VLn from the multipliers MUL11 to MUL28n. The capacitance coupling circuit CPL includes capacitors CL1 to CLn connected in parallel, and the capacitance coupling circuit CPH includes capacitors CH1 to CHn also connected in parallel. Output of the capacitance coupling circuit CPL is connected to the first input of the three MOS inverters I131, I132, I133 connected in series. Output of the last inverter I133 is fed back through the feedback capacitor C331 to the first stage input. The three-stage inverters ensures the linearity of input/output relationship by its sufficiently large open loop gain.

Output of capacitance coupling circuit CPH is connected to the first input of the three-stage MOS inverters I134, I135, I136 connected in series. Output of the last inverter I136 is fed back through the feedback capacitor C333 to the first stage input. The three-stage inverters ensures the linearity of the input/output relationship through its sufficiently large open loop gain. Output of the inverter I333 is connected to the input of I334 through coupling capacitor C333 positioned in parallel to the capacitance coupling circuit CPH. Thus, the sum of the inverse output from CPL and positive output from CPH is inputted to the three-stage inverters I334 to I336.

The outputs of the last MOS inverters I333 and I336 are grounded through ground capacitors C332 and C334, respectively. The outputs of the second MOS inverters I332 and I335 are connected to both of power source voltage Vdd and ground through pairs of equivalent resistors R331 and R332, and R333 and R334, respectively. This circuit prevents oscillation of the inverse amplifier having the feedback system. Adder ADD21 calculates as formula (1). Since the mutual relations of the capacitors are set as formulae (2) to (4), calculation result of formula (5) is obtained.

$$Vout7 = Vdd - \frac{\left(Vdd - \frac{\sum_{i=1}^{n} VLi \cdot CLi}{C71}\right) \cdot CC7 + \sum_{i=1}^{n} VHi \cdot CHi}{C73} \quad (1)$$

$$CL1 = CL2 = \ldots = CLn \quad (2)$$
$$CH1 = CH2 = \ldots = CHn \quad (3)$$
$$C71 = C73 = CC7 = n \cdot CLi = n \cdot CHi \quad (4)$$

-continued $$Vout7 = \frac{\sum_{i=1}^{n} (VLi - VHi)}{n} \quad (5)$$

Outputs VLi and VHi are expressed as formulae (6) and (7) using a reference voltage $V_{REF}$.

$$VHi = Vr + vhi \quad (6)$$
$$VLi = Vr + vli \quad (7)$$

By inserting formulae (6) and (7) into formula (5), formula (8) is obtained.

$$Vout7 = \frac{\sum_{i=1}^{n} (vli - vhi)}{n} \quad (8)$$

Since data is also inverted by the three inverters I291 to I293 in the sample holders SH21 to SH28n, the signal held by the sample holders SH21 to SH28n is expressed as S(t−i*Tc), with a given time "t", chip time Tc, and natural number "i". Formula (8) is rewritten as formula (9) with the multiplied PN code Pni.

$$Vout7 = \frac{\sum_{i=1}^{n} PNi \cdot S(t - i \cdot Tc)}{n} \quad (9)$$

As expressed by equation (9), the matched filters execute general correlative operations for the received signal R(t). PN codes are circulated for the sample holders, and the relations between the sample holders and PN codes are updated every one chip time. In the aforementioned calculation, output is normalized by the number of input, "n." Therefore, the maximum voltage does not exceed the power source voltage, and stable operation is ensured.

Figure 9:
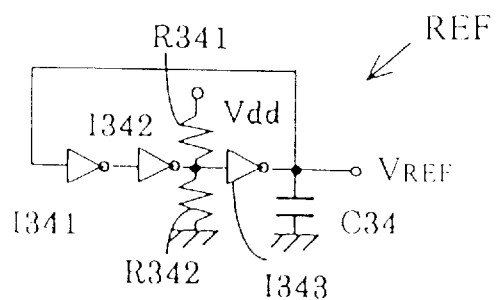
FIG. 9 is a circuit for generating a reference voltage used in the despreading circuit in FIG. 3.

FIG. 9 shows the reference generator REF which generates the reference voltage $V_{REF}$. The reference generator REF comprises three inverters I341, I342 and I343 connected in series, with the last output fed back to the first input. Similar to the aforementioned adder, oscillation is prevented by the ground capacitor C34 and a pair of equivalent resistor R341 and R342. In the reference generator REF, output is converged to the stable point, at which the input and output voltages become equal, and desired reference voltage is generated by setting a threshold voltage of each MOS inverter. To ensure adequate dynamic ranges in positive and negative directions, reference voltage is set to Vdd/2($V_{REF}$=Vdd/2), where Vdd is the power source voltage of the MOS inverter.

According to the first embodiment, the sample holders SH21 to SH2n do not transfer data among them, and data transfer error does not occur. Meanwhile, because the PN codes must be updated sequentially for the receiving signal R(t), the PN codes are circulated. Since the PN codes are binary, general digital circuits can be used for holding and circulating the PN codes, and circulation errors are avoided. Each of the sample holders SH21 to SH2n has a switch SW, which is controlled by the controller CTRL so that only one of the sample holders SH21 to SH2n takes the data in. When the correlative operations are finished for all data in sample holders SH21 to SH2n, new data is taken into a sample holder having the oldest data and PN codes are circulated for the new operation. By repeating this, the matched filters MF1 to MFm successively operate for consecutive signal.

As described above, the received signal R(t) is held by the analog sample holders SH21 to SH2n and supplied to the multipliers MUL11 to MULnm for the PN codes multiplication. The multipliers MUL11 to MULnm branches the inputted signal into two groups corresponding to "+1" and "−1" of the PN code. In this structure, many multiplications and integration can be done by a small circuit with less power. Even with multiple matched filters MF1 to MFm, the circuit scale and power consumption are minimized, and a practical demodulator can be achieved.

2. SECOND EMBODIMENT

Figure 10:
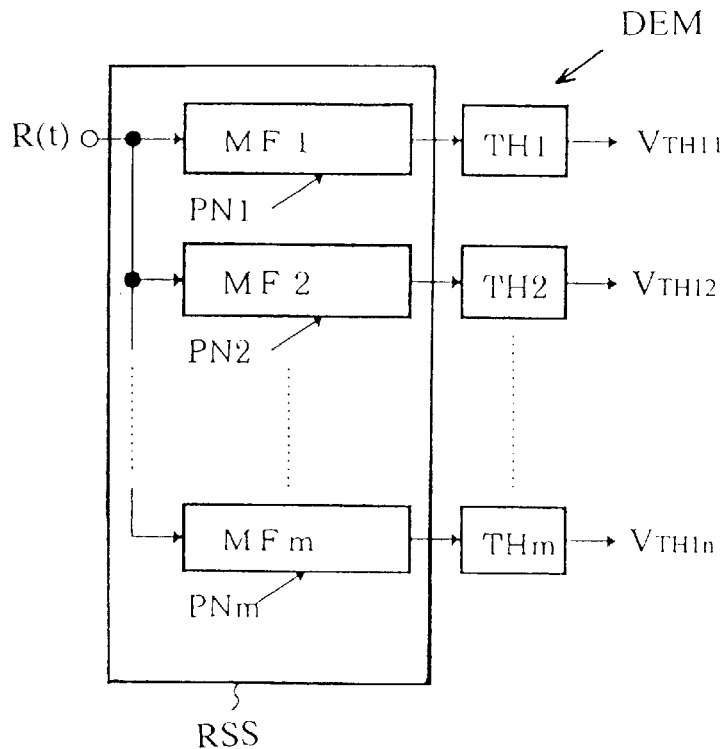
FIG. 10 is a parallel type demodulator DEM according to the second embodiment of the present invention.

FIG. 10 illustrates a demodulator DEM, having a parallel type despreading circuit RSS. In the parallel method, user data is transmitted in parallel, using different PN codes, for the high speed transmission. Similar to the demodulator of the first embodiment (FIG. 2), received signal R(t) is fed to the matched filters MF1 to MFm in parallel, whose outputs are given to the peak detectors TH1 to THm, respectively. The m matched filters MF1 to MFm receive m bit parallel data transmitted using m PN codes. The parallel data are outputted as VTH11 to VTH1m from the peak detectors TH1 to THm.

When the demodulator DEM receives a signal addressed to its station, all matched filters MF1 to MFm generate their peaks. The peak detectors TH1 to THm detect the peaks and output the received data in parallel. The matched filters MF1 to MFm in this embodiment have the same structure as the first embodiment (FIGS. 3 to 9). Therefore, the demodulator DEM are realized by small circuits with less power consumption, thereby reducing the size and power consumption of the demodulator DEM or the CDMA communication station.

3. THIRD EMBODIMENT

Figure 11:
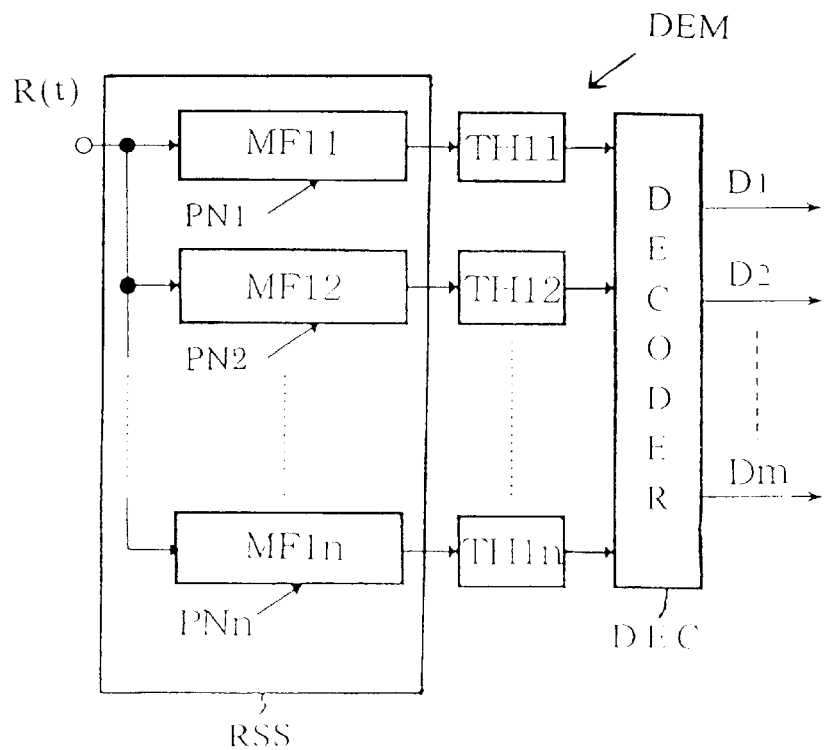
FIG. 11 is a combination parallel type demodulator DEM according to the third embodiment of the present invention.

FIG. 11 illustrates a demodulator having parallel combination type despreading circuit RSS. Similar to the demodulator of the first embodiment (FIG. 2), matched filters MF1 to MFm are connected to the received signal R(t) in parallel. Outputs of the matched filters MF1 to MFm are given to the peak detectors TH1 to THim, respectively, whose outputs are decoded to data D1 to Dn by the decoder DEC10.

In the parallel combination method, several bits of user data are converted to a combination of PN codes, which has been previously assigned to the user bit pattern. The combination of the PN codes are transmitted. Accordingly, a plurality of the matched filters generates their peaks. The decoder DEC detects the combination of the matched filters that generated the peaks.

Within m matched filters, r matched filters make peaks in the parallel combination type method. The peak detectors TH1 to THm detect the peak detecting matched filters. mCr combination types of the signals are received, which are outputted by $n=[\log_2 (mCr)]$ ([x] is a maximum integer which does not exceed x.) output bits D1 to Dn of the decoder DEC. For example, when two of five matched filters MF1 to MF5 detect the peaks (m=5, r=2), $_5C_2=10$ combinations of the signals can be received. Since $[\log_2 10]=[3.32]=3$, three outputs D1, D2, D3, of the decoder DEC are necessary. Here, the outputs D1, D2, D3 can be assigned to the combinations of the peak detecting matched filters as follows.

| Peak Detected Matched Filters | Decoder DEC Outputs (D3, D2, D1) |
|---|---|
| MF1, MF2 | (0, 0, 0) |
| MF1, MF3 | (0, 0, 1) |
| MF1, MF4 | (0, 1, 0) |
| MF1, MF5 | (0, 1, 1) |
| MF2, MF3 | (1, 0, 0) |

-continued

| Peak Detected Matched Filters | Decoder DEC Outputs (D3, D2, D1) |
|---|---|
| MF2, MF4 | (1, 0, 1) |
| MF2, MF5 | (1, 1, 0) |
| MF3, MF4 | (1, 1, 1) |
| MF3, MF5 | Error |
| MF4, MF5 | Error |

When the matched filters MF3 and MF5 detect the peaks, or when the matched filters MF4 and MF5 detect the peaks, the decoder DEC determines that a matched filter made an error. These extra two combinations can be used for an error detection.

The m matched filters MF1 to MFm in this embodiment have the same structure as the first embodiment (FIGS. 2 and 3). According to the present invention, matched filters MF1 to MFm can be realized by a small circuit with less power consumption, thereby reducing the size and power consumption of the demodulator DEM and the CDMA communication station.

4. FOURTH EMBODIMENT

Figure 12:
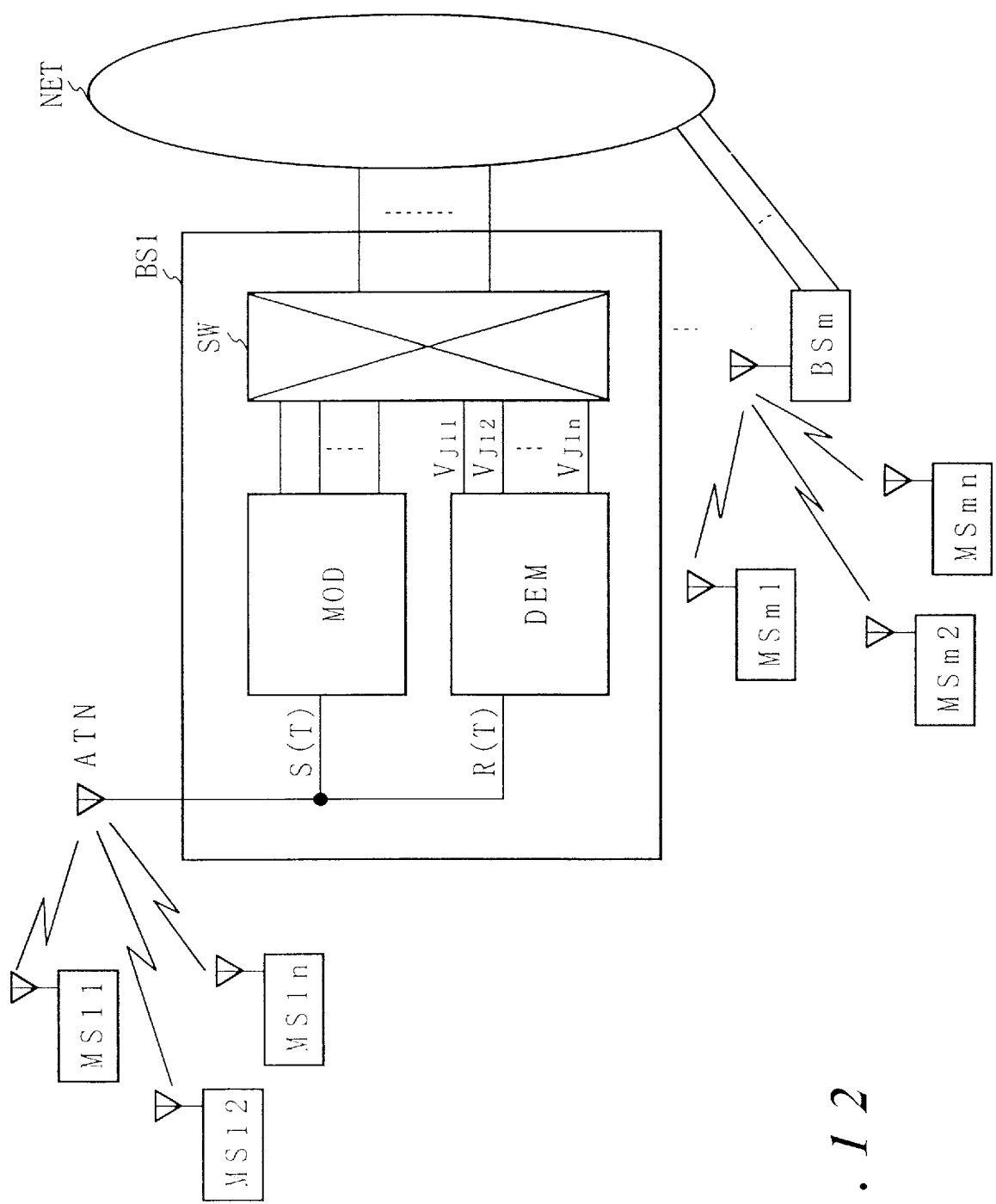
FIG. 12 is a CDMA communication system including abase station BS of the present invention.

FIG. 12 shows a DS-CDMA communication system of the present invention. Base station BS receives a signal R(t), which includes CDMA spread signals of user stations MS1 to MSn. The spread signals from the user stations MS1 to MSn are spread with different PN codes. A multi-user demodulator DEM of the base station BS demodulates the received signal R(t) and outputs despread user signals VJ11 to VJ1n of the user stations MS1 to MSn. A modulator MOD modulates user signals and sends them to the user stations MS1 to MSn through the antenna ATN. A switch SW switches the user data to and from the network NET.

Figure 13:
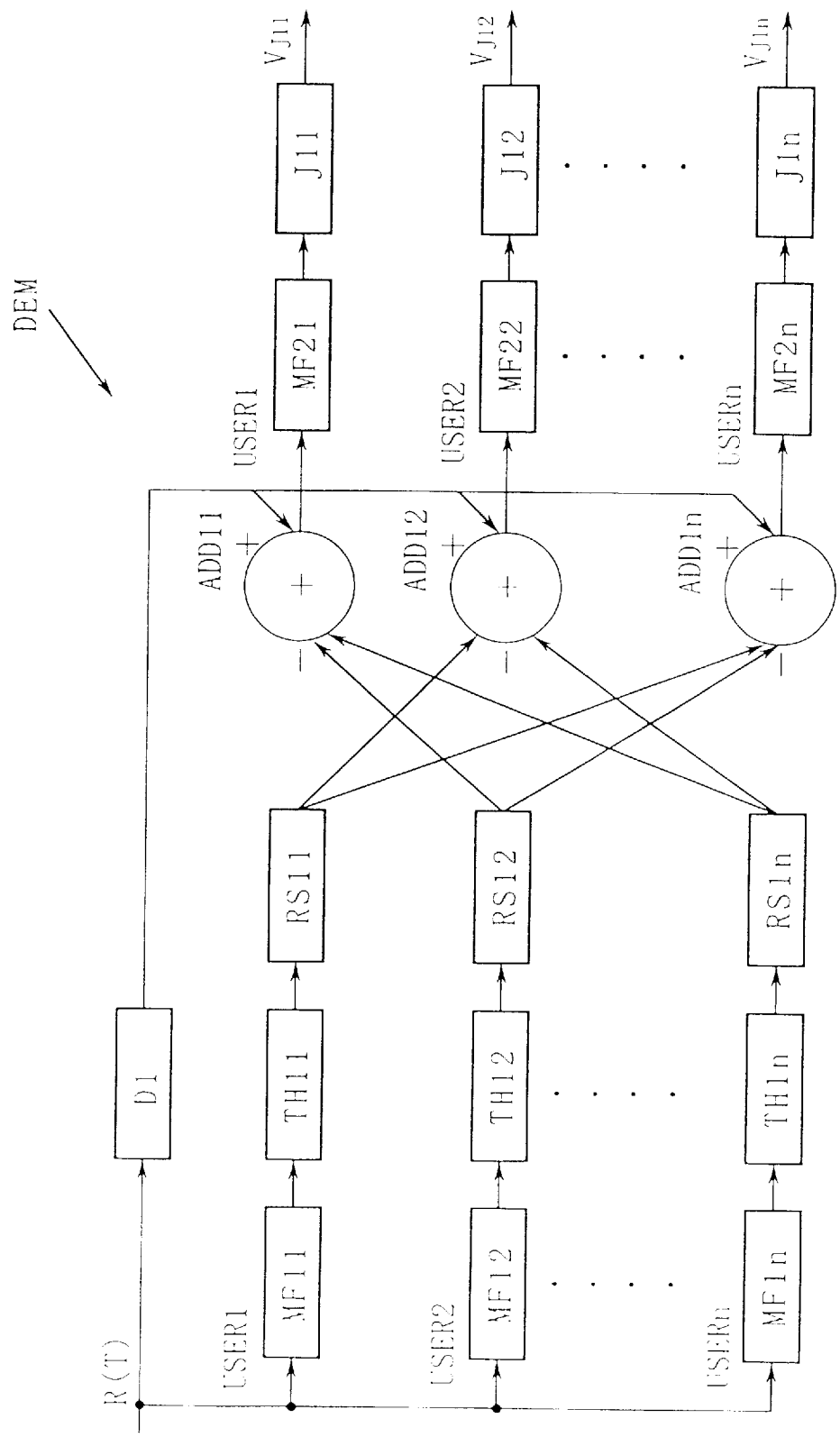
FIG. 13 is a block diagram of a multi-user type demodulator DEM.

FIG. 13 illustrates an example of the multi-user demodulator DEM in FIG. 12. Matched filters MF11 to MF1n despread the received signal R(t) to extract the corresponding user signal. In the DS-CDMA method, each user is generally assigned a high orthogonal spreading code that has low correlation with others and causes low interference. However, when many users are communicating with the base station BS, the interference level rises, and it is difficult to demodulate accurately. To overcome this interference issue, outputs VMF11 to VMF1n of the matched filters MF11 to MF1n are respectively inputted to the dominant signal extractors TH11 to TH1n (comprehensively referred to as TH1) which compulsorily remove interference signals and extract only the dominant signal based on a threshold.

Each of the dominant signal extractors TH11 to TH1n processes the inputted signal with a threshold, which is obtained by multiplying the peak voltage having a maximum power within one symbol time by a predetermined ratio. The outputs VTH11 to VTH1n from the dominant signal extractors TH11 to TH1n are inputted to the respreading circuits RS11, RS12, . . . , RS1n (comprehensively referred to as RS1), and respread. The respread outputs VRS11 to VRS1n from the respreading circuits RS1 are replica signals approximate to the respective user signals. For example, output VRS11 from RS11 is a replica signal of the first user which will be used as interference replica for canceling interference to other users.

Adders ADD11 to ADD1n (comprehensively referred to as ADD1) input replica signals VRS11 to VRS1n to produce despread signals of respective users. More particularly, the adder ADD1i sums up the replica signals other than the i-th user signal, and subtracts the sum from the received signal R(t) to produce despread signals of i-th user. The received signal R(t) is delayed by a delay D1 to perfectly synchronizes with the signals which went through the matched filters MF1, dominant signal extractors TH1, and respreading circuits RS1.

Complex matched filters MF21 to MF2n input the extracted spread signals from adders ADD11 to ADD1n and perform correlative operation to ideally extract despread signals VMF21 to VMF2n of corresponding users. Decision circuits J11 to J1n determine and reproduce user signals. For example, when the received signal was modulated by a transmitter with QPSK, the decision circuit demodulates the QPSK signal given by the second matched filter to a binary signal.

Figure 14:
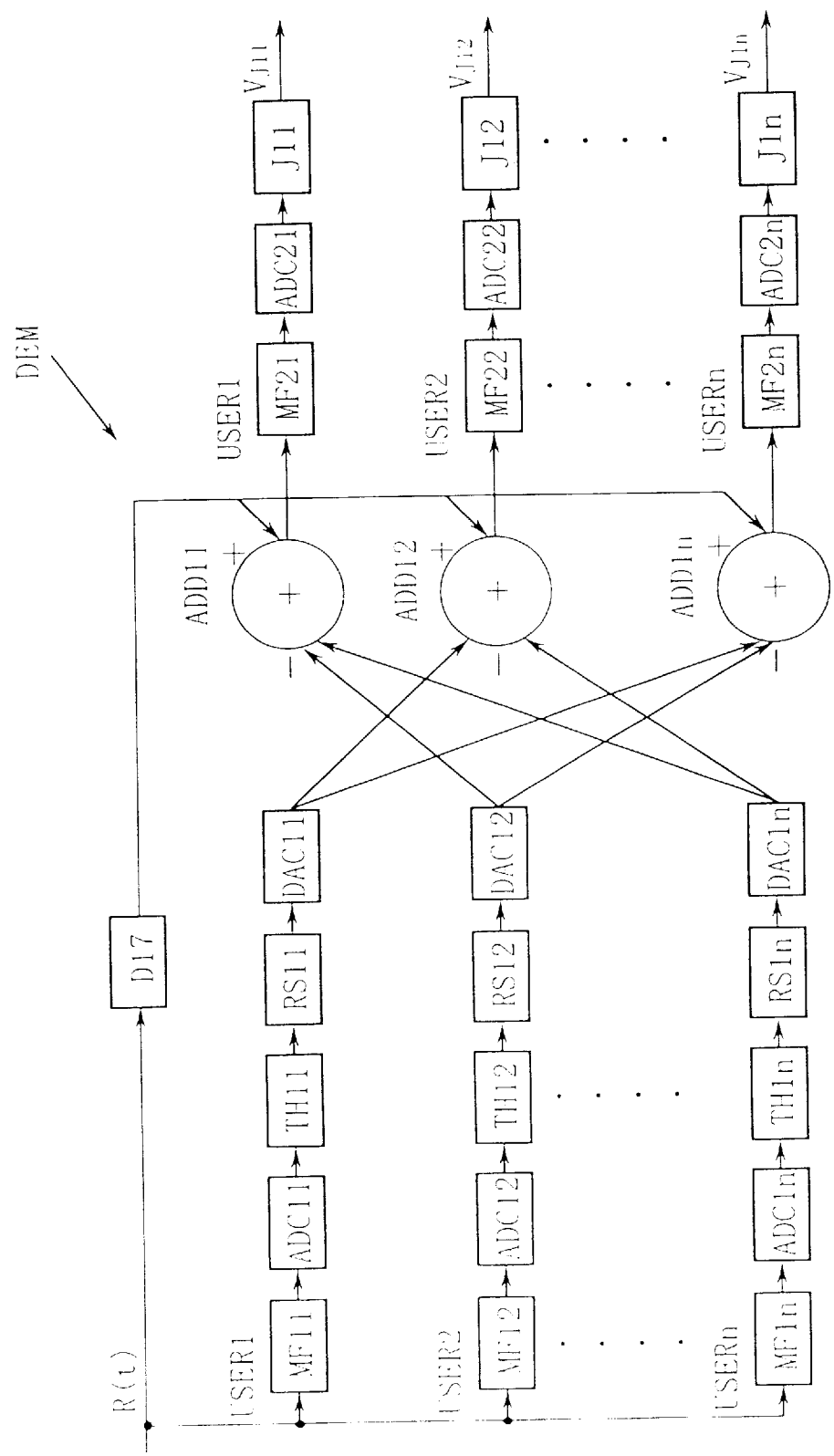
FIG. 14 is a block diagram of a multi-user type demodulator DEM having analog matched filters.

FIG. 14 shows different structure of the demodulator DEM. Dominant signal extractors TH1, respreading circuits RS1, and decision circuits J11 to J1n are dedicated digital circuits. Other elements are dedicated analog circuits. Received signal R(t) is inputted to analog matched filters MF11 to MF1n and analog delay D17. The output of the matched filters MF11 to MF1n are inputted to respreading circuits RS11 to RS1n through A/D converters ADC11 to ADC1n and dominant signal extractors TH11 to TH1n, respectively. The outputs of the respreading circuits RS11 to RS1n are inputted to adders ADD11 to ADD1n through D/A converters DAC11 to DAC1n. The adders ADD11 to ADD1n subtract the output of D/A converters DAC11 to DAC1n from the output of delay D17. The results are inputted to matched filters MF21 to MF2n, and are further supplied through A/D converters ADC21 to ADC2n to decision circuits J11 to J1n, respectively.

Figure 15:
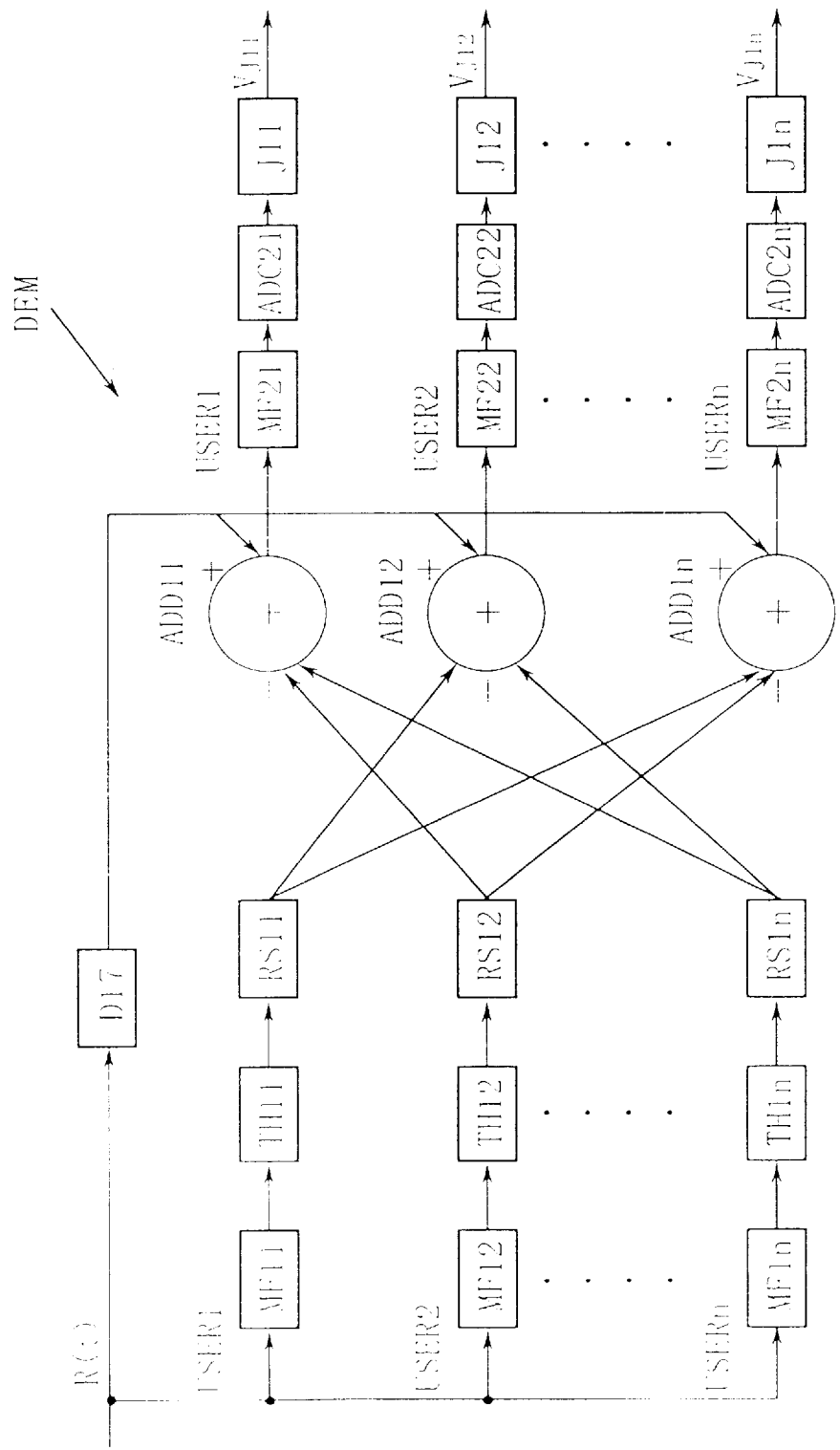
FIG. 15 is a block diagram of the multi-user type demodulator DEM having more analog circuit.

FIG. 15 shows still different type of multi-user demodulator DEM. In FIG. 36, dominant signal extractors TH11 to TH1n and respreading circuits RS11 to RS1n are also analog. Therefore, A/D converters ADC11 to ADC1n and D/A converters DAC11 to DAC1n in FIG. 14 are not necessary and eliminated.

In FIGS. 13 to 15 matched filters MF11 to MF1n have the same structure as the first embodiment (FIGS. 2 and 3). According to the present embodiment, matched filters can be realized by a small circuit with less power consumption, thereby reducing the size and power consumption of the demodulator DEM and the CDMA communication station.

5. OTHER

Although the present invention was described through several embodiments, the scope of the invention is not limited by the embodiments. It is clear for the person skilled in the art that various modifications can be made and that such modifications are within the scope of the invention as clear from the following claims.

For example, the matched filters MF1 TO MFm, MF11 to MF1n, and MF21 to MF2n, dominant signal extractors TH1 to THn and TH11 to TH1n, respreading circuits RS11 to RS1n, adders ADD11 to ADD1n, and decision circuits J11 to J1n can be realized variously as follows. The dedicated analog or digital circuit should be increased to increase the process speed. In view of power consumption, analog circuit is more advantageous than digital circuit.

(1) The entire system can realized by software on a general-purpose computer.

(2) Only the matched filters that are high load for CPU are realized by DSP or dedicated digital circuits, and other parts are realized by computer software.

(3) The entire system is realized by DSP and dedicated digital circuits.

(4) Only the matched filters with high load for CPU are realized by analog circuits, and the other parts are realized by computer software.

(5) Only the matched filters are realized by analog circuits, and the other parts are realized by DSP or dedicated digital circuits.

(6) The entire system is realized by analog circuits.

As described, according to the present invention, the input signal is supplied to one of the sample holders through a switch. This structure realizes a small-scale circuit with less power consumption, which is suitably applicable to high-speed spectrum spreading communication and multi-user demodulator.

What is claimed is:

1. A demodulator for a spread spectrum communication having a plurality of matched filters in parallel, each of said matched filters comprising:

a different binary PN code, a plurality of sample holders having a common input, each including, a switch, a first capacitor, a first inverse amplifier having an output, and an input connected to the common input through the switch and the capacitor, and a first feedback capacitor for feeding the output of the first inverse amplifier back to the input thereof;

a plurality of multipliers, each having a first and second sub-multiplexers, one of sub-multiplexer selecting corresponding sample holder output and another sub-multiplexer selecting a reference voltage;

an adder having a plurality of second capacitors, a second inverse amplifier including an output, and an input connected to each of the first sub-multiplexers through each of the second capacitors, a second feedback capacitor for feeding the output of the second inverse amplifier back to the input thereof, a plurality of third capacitors, a third inverse amplifier having an output, and an input connected to each of the second sub-multiplexers and second inverse amplifier through each of the third capacitors, and a third feedback capacitor for feeding the output of the third inverse amplifier back to the input thereof;

a controller which closes one of the switches of the sample holders while opening the other switches, and switches over the first and second sub-multiplexers with a predetermined combination in response to the binary PN code for a multiplication of the binary PN code.

2. The demodulator according to claim 1 for an M-array type spread spectrum communication, wherein:

each signal corresponds to one of the PN codes; and when one of the matched filters generates a peak, the signal related to the PN code of the peak generating matched filter is determined to be received.

3. The demodulator according to claim 1, for a parallel type spread spectrum communication, wherein:

each signal corresponds to one of the PN codes;

when a plurality of the matched filters generate peaks, the signals corresponding to the PN codes of the peak generating matched filters are determined to be received; and outputs of the peak detecting matched filters are used as a set of a received signal.

4. The demodulator according to claim 1, for a parallel combination type spread spectrum communication, wherein:

signal sequences corresponding to a combination of the PN codes are defined in advance; and when the matched filter generates a peak, the signal sequence corresponding to the combination of the PN codes of the peak detecting matched filters is determined to be received.

5. The demodulator according to claims 2, wherein:

each of the first, second and third inverse amplifiers have odd number of MOS inverters; and each of the sample holders is used for the plurality of matched filters in common.

6. The demodulator according to claims 3, wherein:

each of the first, second and third inverse amplifiers have odd number of MOS inverters; and each of the sample holders is used for the plurality of matched filters in common.

7. The demodulator according to claims 4, wherein:

each of the first, second and third inverse amplifiers have odd number of MOS inverters; and each of the sample holders is used for the plurality of matched filters in common.

8. A demodulator according to claim 1, for a base station which communicates with a plurality of user stations by DS-CDMA spectrum spread communication, wherein each of the PN codes corresponds to each user station, and the matched filters acquire a correlation of a received signal with respective PN code assigned as a tap coefficient, further comprising:

signal extractors, each of which extracts a signal with high level as a dominant signal, from an output of respective matched filter;

respreading circuits, each of which respreads spectrum of the dominant signal obtained by respective dominant signal extractor with the respective user's spectrum spreading code;

a delay that delays the received signal by a predetermined period;

first adders, each of which subtracts outputs of the respreading circuits other than a specific user's respread signal, from the output of the delay;

second matched filters, each of which despreads the spectrum of an output of the respective first adder, with the spectrum spreading codes assigned to the specific user; and decision circuits, each of which determines respective user signal from each of the second matched filters.

9. The multi-user demodulator according to claim 8, wherein:

each of the signal extractors extracts the signal with high level by a threshold operation using a product of the maximum output of the respective first matched filter by a predetermined ratio as a threshold.

10. A spread spectrum communication station having a demodulator which comprises a plurality of matched filters in parallel, an antenna which feeds a received signal to the demodulator, and a network switch which switches the signal to and from a network wherein each of said matched filters comprising:

a different binary PN code, a plurality of sample holders having a common input, each including, a switch, a first capacitor, a first inverse amplifier having an output, and an input connected to the common input through the switch and the capacitor, and a first feedback capacitor for feeding the output of the first inverse amplifier back to the input thereof;

a plurality of multipliers, each having a first and second sub-multiplexers, one of sub-multiplexer selecting corresponding sample holder output and another sub-multiplexer selecting a reference voltage;

an adder having a plurality of second capacitors, a second inverse amplifier including an output, and an input connected to the first sub-multiplexers through the second capacitors, a second feedback capacitor for feeding the output of the second inverse amplifier back to the input thereof, a plurality of third capacitors, a third inverse amplifier having an output, and an input connected to the second sub-multiplexers and second inverse amplifier through the third capacitors, and a third feedback capacitor for feeding the output of the third inverse amplifier back to the input thereof;

a controller which closes one switch of the sample holders while opening the other switches, and switches over the first and second sub-multiplexers with a predetermined combination in response to the PN code of the multiplexer.

11. A spread spectrum communication station according to claim 10 wherein:

the demodulator is for an M-array type spread spectrum communication;

each signal corresponds to one of the PN codes; and when one of the matched filters generates a peak, the signal related to the PN code of the peak generating matched filter is determined to be received.

12. A spread spectrum communication station according to claim 10 wherein;

the demodulator is for a parallel type spread spectrum communication;

each signal corresponds to one of the PN codes;

when a plurality of the matched filters generate peaks, the signals corresponding to the PN codes of the peak generating matched filters are determined to be received; and outputs of the peak detecting matched filters are used as a set of a received signal.

13. A spread spectrum communication station according to claim 10, wherein:

the demodulator is for a parallel combination type spread spectrum communication; and signal sequences corresponding to a combination of the PN codes are defined in advance; and when the matched filter generates a peak, the signal sequence corresponding to the combination of the PN codes of the peak detecting matched filters is determined to be received.

14. The spread spectrum communication station according to claim 11, wherein:

each of the first, second and third inverse amplifiers have odd number of MOS inverters; and each of the sample holders is used for the plurality of matched filters in common.

15. The spread spectrum communication station according to claim 12, wherein:

each of the first, second and third inverse amplifiers have odd number of MOS inverters; and each of the sample holders is used for the plurality of matched filters in common.

16. The spread spectrum communication station according to claim 13, wherein:

each of the first, second and third inverse amplifiers have odd number of MOS inverters; and each of the sample holders is used for the plurality of matched filters in common.

17. A spread spectrum communication station according to claim 10 which communicates with a plurality of user stations by DS-CDMA communication, wherein each of the PN codes corresponds to each user station, and the matched filters acquires a correlation of a received signal with respective PN code assigned as a tap coefficient, further comprising:

signal extractors, each of which extracts a signal with high level as a dominant signal, from an output of respective matched filter;

respreading circuits, each of which respreads spectrum of the dominant signal obtained by respective dominant signal extractor with the respective user's spectrum spreading code;

a delay that delays the received signal by a predetermined period;

first adders, each of which subtracts outputs of the respreading circuits other than a specific user's respread signal, from the output of the delay;

second matched filters, each of which despreads the spectrum of an output of the respective first adder, with the spectrum spreading codes assigned to the specific user; and decision circuits, each of which determines respective user signal from each of the second matched filters.

18. A spread spectrum communication station according to claim 17, wherein:

each of the signal extractors extracts the signal with high level by a threshold operation using a product of the maximum output of the respective first matched filter by a predetermined ratio as a threshold.

* * * * *